(12) United States Patent
Papageorgiou et al.

(10) Patent No.: US 12,488,613 B2
(45) Date of Patent: Dec. 2, 2025

(54) ULTRASONIC FINGERPRINT SENSOR WITH PASSIVE AND ACTIVE COMMON MODE CANCELLATION

(71) Applicant: QUALCOMM Incorporated, San Diego, CA (US)

(72) Inventors: Efthymios Philip Papageorgiou, Berkeley, CA (US); Jessica Liu Strohmann, Cupertino, CA (US); Jae Hyeong Seo, Pleasanton, CA (US); Hrishikesh Vijaykumar Panchawagh, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 18/654,272

(22) Filed: May 3, 2024

(65) Prior Publication Data

US 2025/0342714 A1 Nov. 6, 2025

(51) Int. Cl.
*G06V 40/13* (2022.01)
(52) U.S. Cl.
CPC .............. *G06V 40/1306* (2022.01)
(58) Field of Classification Search
CPC .................................. G06V 40/1306
See application file for complete search history.

(56) References Cited

U.S. PATENT DOCUMENTS

| | | | |
|---|---|---|---|
| 2009/0123039 A1 | 5/2009 | Gozzini | |
| 2014/0352440 A1 | 12/2014 | Fennell et al. | |
| 2018/0188881 A1* | 7/2018 | Kyoung | G06F 3/0446 |
| 2018/0268187 A1 | 9/2018 | Jeong et al. | |
| 2020/0380231 A1* | 12/2020 | Cheng | H03K 17/9622 |
| 2024/0021008 A1* | 1/2024 | Du | H03M 1/12 |

OTHER PUBLICATIONS

International Search Report and Written Opinion—PCT/US2025/018373—ISA/EPO—Jun. 6, 2025.

* cited by examiner

*Primary Examiner* — Lixi C Simpson
(74) *Attorney, Agent, or Firm* — QUALCOMM Incorporated

(57) ABSTRACT

An apparatus for common mode noise cancellation in an ultrasonic fingerprint sensor comprising a resistor-inductor-capacitor (RLC) network, a piezoelectric layer, a pixel array electrically coupled with the RLC network at a first end of the RLC network and either: (A) a common mode canceling capacitive element electrically coupled with the RLC network in parallel with the pixel array and configured to attenuate at least a portion of the common mode component from the acoustic signal before the acoustic signal is received by the pixel array or (B) a common mode canceling circuitry electrically coupled with the RLC network at a second end of the RLC network and configured to introduce a feedback signal to the pixel array through the RLC network, wherein the feedback signal is determined based on the received acoustic signal at each pixel within the pixel array.

20 Claims, 11 Drawing Sheets

ULTRASONIC FINGERPRINT SENSOR WITH PASSIVE AND ACTIVE COMMON MODE CANCELLATION

TECHNICAL FIELD

The present disclosure relates generally to sensor devices and related methods and more specifically relates to ultrasonic fingerprint sensor systems with common mode canceling components.

BACKGROUND

Biometric authentication can be an important feature for controlling access to devices, etc. Many existing products include some type of biometric authentication. Although some existing biometric authentication technologies provide satisfactory performance, improved methods and devices would be desirable.

BRIEF SUMMARY

An example apparatus may comprise a resistor-inductor-capacitor (RLC) network and a piezoelectric layer. The RLC network and the piezoelectric layer may be configured to obtain an acoustic signal that comprises a common mode component and a detection signal component indicative of a fingerprint pattern. The apparatus may also comprise a pixel array electrically coupled with the RLC network at a first end of the RLC network and configured to receive the acoustic signal. Each pixel within the pixel array may be coupled with at least a portion of the piezoelectric layer and may be configured to detect a portion of the detection signal component. The apparatus may further comprise either: (A) a common mode canceling capacitive element electrically coupled with the RLC network in parallel with the pixel array and configured to attenuate at least a portion of the common mode component from the acoustic signal before the acoustic signal is received by the pixel array, or (B) a common mode canceling circuitry electrically coupled with the RLC network at a second end of the RLC network and configured to introduce a feedback signal to the pixel array through the RLC network, where the feedback signal may be determined based on the received acoustic signal at each pixel within the pixel array.

An example method for common mode noise cancellation in an ultrasonic fingerprint sensor, the method may comprise obtaining an acoustic signal using a RLC network and a piezoelectric layer. The acoustic signal may comprise a common mode component and a detection signal component indicative of a fingerprint pattern. The method may also comprise canceling at least a portion of the common mode component from the acoustic signal by employing a common mode canceling capacitive element that is electrically coupled with the RLC network in parallel with a pixel array. The method may further comprise receiving the acoustic signal at the pixel array, where each pixel within the pixel array is coupled with at least a portion of the piezoelectric layer and is configured to detect a portion of the detection signal component. The method may yet comprise processing the received acoustic signal to generate data indicative of the fingerprint pattern.

An example method for common mode noise cancellation in an ultrasonic fingerprint sensor, the method may comprise obtaining an acoustic signal using a resistor-inductor-capacitor (RLC) network and a piezoelectric layer. The acoustic signal may comprise a common mode component and a detection signal component indicative of a fingerprint pattern. The acoustic signal may be configured to be received by a pixel array connected to a first end of the RLC network, wherein each pixel within the pixel array is coupled with at least a portion of the piezoelectric layer and is configured to detect a portion of the detection signal component. The method may further comprise canceling at least a portion of the common mode component from the acoustic signal by introducing a feedback signal to a second end of the RLC network using a common mode canceling circuitry, where the feedback signal may be determined based on the received acoustic signal at each pixel within the pixel array. The method may yet comprise receiving the acoustic signal at the pixel array and processing the received acoustic signal to generate data indicative of the fingerprint pattern.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
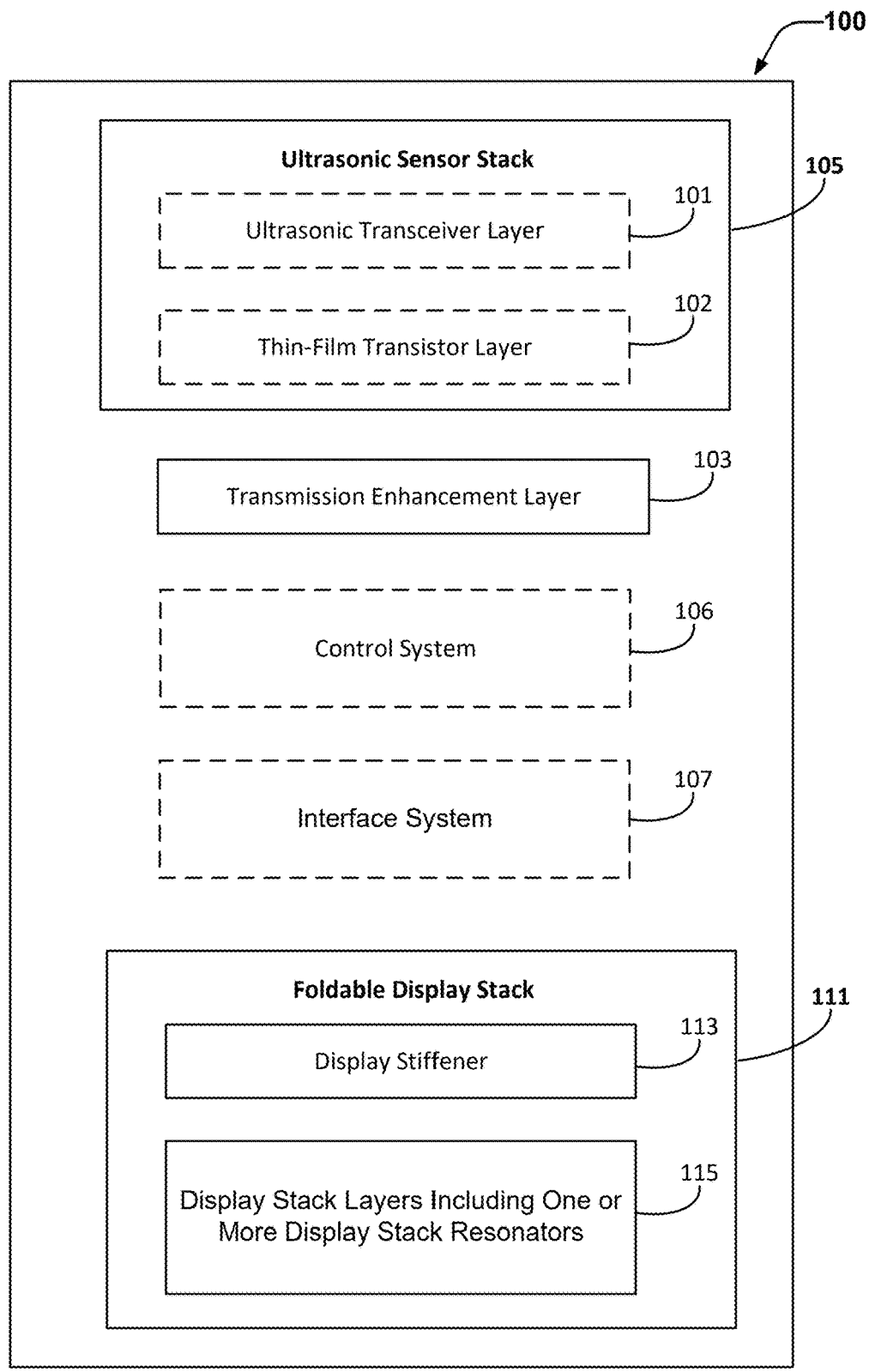
FIG. 1 is a block diagram showing example components of an ultrasonic sensor system.

Like reference symbols in the various drawings indicate like elements in accordance with certain example implementations. In addition, multiple instances of an element may be indicated by following a first number for the element with a letter or a hyphen and a second number. For example, multiple instances of an element 110 may be indicated as 110-1, 110-2, 110-3 etc., or as 110a, 110b, 110c, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system, as disclosed herein. In addition, it is contemplated that the described implementations may be included in or associated with a variety of electronic devices such as, but not limited to: mobile devices, mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes, and electronic test equipment. Thus, the teachings are not intended to be limited to the implementations depicted solely in the figures but instead have wide applicability as will be readily apparent to one having ordinary skill in the art.

As used herein, the terms "capacitor," "capacitive element," and variants refer to any components that possess capacitance.

As used herein, the terms "cancel," "mitigate," "attenuate," and variants refer to action(s) taken to reduce or eliminate at least a portion of a signal.

Incorporating an ultrasonic sensor system into an apparatus, a structure, etc., can present various design challenges. For example, designing an under-display ultrasonic sensor system that provides acceptable performance is challenging. Designing an under-display ultrasonic sensor system for foldable display devices presents additional challenges. In such devices, the acoustic signal tends to become trapped within the layers of the display stack, leading to a lowered signal-to-noise ratio (SNR). Consequently, when processing the amplified signal, including the common mode (CM) component, also referred to as background noise, for better detection sensitivity levels, the analog-to-digital converter (ADC) is prone to saturation, impairing the system's ability to accurately process the detection signal component (e.g., data indicative of a fingerprint pattern). One approach to mitigate this issue involves optimizing the display stack itself to minimize signal trapping; however, this requires close collaboration with display vendors and may not be feasible in all circumstances.

Various aspects of the present disclosure generally relate to ultrasonic sensors and, more particularly, to ultrasonic fingerprint sensor systems with components specifically designed to attenuate the common mode signal within the system. For example, the system may include a resistor-inductor-capacitor (RLC) network and a piezoelectric layer, which together may be configured to obtain an acoustic signal. The acoustic signal may comprise a common mode component and a detection signal component indicative of a fingerprint pattern. Additionally, the system may include a pixel array electrically coupled with the RLC network at one end. Each pixel within the pixel array is coupled with a portion of the piezoelectric layer and is configured to detect a portion of the detection signal component. To achieve the common mode signal cancelation effect, the system may feature a common mode canceling capacitive element electrically coupled with the RLC network in parallel with the pixel array. The common mode canceling capacitive element is configured to attenuate at least a portion of the common mode component from the acoustic signal before it is received by the pixel array. Additionally, or alternatively, the system may include a common mode canceling circuitry electrically coupled with the RLC network at another end (different from the end electrically connecting to the pixel array) and is configured to introduce a feedback signal to the pixel array through the RLC network. The feedback signal, determined based on the received acoustic signal at each pixel within the pixel array, may have a phase opposite to that of the received acoustic signal. In some embodiments, the RLC network may be integrated into the common mode canceling circuitry that introduces the feedback signal, serving as part or all of the common mode canceling circuitry.

Particular aspects of the subject matter described in this disclosure can be implemented to realize one or more of the following potential advantages. In some implementations, introducing a capacitive element and/or circuitry for common mode cancellation into the system may significantly mitigate or even eliminate the common mode signal before it is further processed to generate data indicative of the fingerprint pattern (e.g., before reaching a thin-film transistor (TFT) layer, as discussed below). Such mitigation enhances the SNR of the fingerprint sensing process and prevents ADC saturation, thereby increasing the fidelity and reliability of the ultrasonic fingerprint sensor's performance.

FIG. 1 is a block diagram that shows example components of an ultrasonic sensor system 100 (e.g., an ultrasonic fingerprint sensor system) according to some disclosed implementations. As with other disclosed implementations, the numbers, types, and arrangements of elements shown in FIG. 1 are merely presented by way of example. Although not shown in FIG. 1, the ultrasonic sensor system 100 may include other components, such as a cover (which may be or may include a cover glass), one or more adhesive layers, one or more electrode layers, etc. Some examples are described below. In some implementations, the ultrasonic sensor system 100 may be a mobile device that includes the elements shown in FIG. 1.

According to this example, the ultrasonic sensor system 100 includes an ultrasonic sensor stack 105. In some examples, the ultrasonic sensor stack 105 includes an ultrasonic transceiver layer 101 and a TFT layer 102. In some such examples, the ultrasonic transceiver layer 101 may be configured to function as both an ultrasonic transmitter and an ultrasonic receiver. According to some implementations, the ultrasonic transceiver layer 101 may be a single piezoelectric layer, whereas in other implementations, the ultrasonic transceiver layer 101 may be a multilayer piezoelectric structure or an array of such structures.

For example, in some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some alternative examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs may be used as ultrasonic transmitters as well as ultrasonic receivers.

The TFT layer 102 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass. According to some implementations, the TFT layer 102 may have a thickness that is in the range of 50 microns to 400 microns.

In this implementation, the apparatus includes a foldable display stack 111. According to this example, the foldable display stack 111 includes a display stiffener 113 and display stack layers 115. The display stack layers 115 may, in some examples, include layers of a light-emitting diode (LED) display, such as an organic light-emitting diode (OLED) display. Some examples of display stack layers 115 are provided in this disclosure.

In this example, the display stack layers 115 form one or more display stack resonators. The display stack resonator(s) may, in some examples, be configured to enhance ultrasonic waves transmitted by the ultrasonic sensor stack in a first ultrasonic frequency range. In some examples, the one or more display stack resonators may include a first resonator bounded by the display stiffener 113 and a glass layer of the display stack layers 115. In some such examples, the first resonator may include a plurality of layers of an organic light-emitting diode display. In some examples, the one or more display stack resonators may include a second resonator bounded by the glass layer and an outer surface of the foldable display stack.

In some examples, the display stiffener 113 may have a relatively high acoustic impedance, e.g., an acoustic impedance of 10 MRayls or more. In some implementations, the display stiffener 113 may be or may include a metal layer (e.g., a stainless-steel layer having an acoustic impedance of approximately 47 MRayls). However, in other implementations, the display stiffener 113 may include one or more other metals or non-metal materials having a relatively high modulus of elasticity. According to some examples, the display stiffener 113 may have a thickness in the range of 30 microns to 300 microns. According to some examples, the display stiffener 113 may have a thickness corresponding to a multiple of a half wavelength of a shear wave or a longitudinal wave having a frequency in a second ultrasonic frequency range that is higher than the first ultrasonic frequency range. However, in some instances, the display stiffener 113 may not be, or may not include, a material having a high acoustic impedance. For example, in some instances, the display stiffener 113 may include a plastic layer, such as a polycarbonate layer. In some such instances, the disclosed transmission enhancement layer 103 may not be beneficial.

According to this example, the ultrasonic sensor system 100 includes a transmission enhancement layer 103. In some examples, the transmission enhancement layer 103 may be or may include, an aluminum layer having a thickness in a range from 50 microns to 100 microns, a copper layer having a thickness in a range from 25 microns to 50 microns, or a stainless-steel layer having a thickness in the range from 25 microns to 50 microns. According to some examples, the transmission enhancement layer 103 may have a thickness of less than a quarter wavelength of a shear wave or a longitudinal wave having a frequency in the first ultrasonic frequency range. In some examples, the transmission enhancement layer 103 may reside between the ultrasonic sensor stack 105 and the foldable display stack 111. In some such examples, the transmission enhancement layer 103 may reside between the ultrasonic sensor stack 105 and the display stiffener 113. According to some such examples, the display stiffener 113, the transmission enhancement layer 103, and at least a portion of the ultrasonic sensor stack 105 (e.g., the TFT substrate of the TFT layer 102) form a transmission enhancement resonator that is configured to enhance the ultrasonic waves transmitted by the ultrasonic sensor stack in an ultrasonic frequency range that is suitable for ultrasonic fingerprint sensors. Some examples are described below.

In some examples, the ultrasonic sensor system 100 may include a control system 106. The control system 106 (when present) may include one or more general-purpose single- or multi-chip processors, digital signal processors (DSPs), application-specific integrated circuits (ASICs), field programmable gate arrays (FPGAs) or other programmable logic devices, discrete gates or transistor logic, discrete hardware components, or combinations thereof. The control system 106 may also include (and/or be configured for communication with) one or more memory devices, such as one or more random access memory (RAM) devices, read-only memory (ROM) devices, etc. Accordingly, the ultrasonic sensor system 100 may have a memory system that includes one or more memory devices, though the memory system is not shown in FIG. 1. The control system 106 may be capable of receiving and processing data from the ultrasonic transceiver layer 101 and/or from an array of sensor pixels, e.g., as described below. In some implementations, the functionality of the control system 106 may be partitioned between one or more controllers or processors, such as a dedicated sensor controller and an applications processor of a mobile device.

Some implementations of the ultrasonic sensor system 100 may include an interface system 107. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 107 may be configured to provide communication (which may include wired or wireless communication, such as electrical communication, radio communication, etc.) between components of the ultrasonic sensor system 100. In some such examples, the interface system 107 may be configured to provide communication between the control system 106 and the ultrasonic transceiver layer 101, to provide communication between the control system 106 and one or more of the display stack layers 115 and/or to provide communication between the control system 106 and an array of sensor pixels. According to some such examples, a portion of the interface system 107 may couple at least a portion of the control system 106 to the ultrasonic transceiver layer 101 and/or an array of sensor pixels, e.g., via electrically conducting material.

According to some examples, the interface system 107 may be configured to provide communication between the ultrasonic sensor system 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the ultrasonic sensor system 100 may include a memory system. The interface system 107 may, in some examples, include at least one interface between the control system 106 and a memory system.

The ultrasonic sensor system 100 may be used in a variety of different contexts, many examples of which are disclosed herein. For example, in some implementations, a mobile device, such as a cell phone, a smartphone, a tablet, a laptop (e.g., a laptop touchpad), etc., may include at least a portion of the ultrasonic sensor system 100. In some implementations, a wearable device may include at least a portion of the ultrasonic sensor system 100. The wearable device may, for example, be a watch, a bracelet, an armband, a wristband, a ring, a headband, or a patch. In some implementations, the control system 106 may reside in more than one device. For example, a portion of the control system 106 may reside in a wearable device, and another portion of the control system 106 may reside in another device, such as a mobile device (e.g., a smartphone or a tablet computer) and/or a server. The interface system 107 also may, in some such examples, reside in more than one device.

Figure 2:
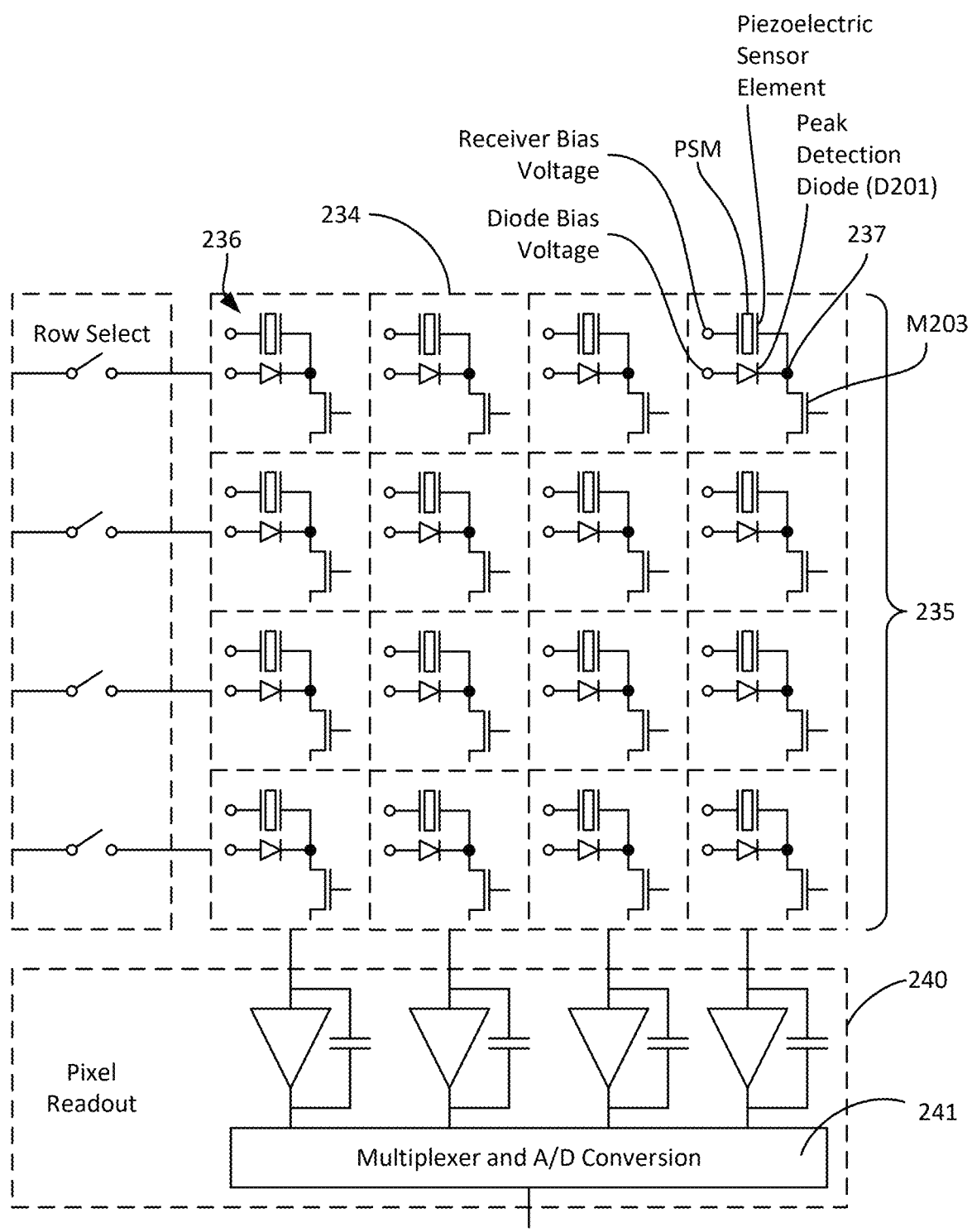
FIG. 2 is a diagram representationally illustrating aspects of a 4×4-pixel array of sensor pixels for an ultrasonic sensor system.

FIG. 2 is a diagram representationally illustrating aspects of a 4×4-pixel array of sensor pixels for an ultrasonic sensor system. In the illustrated implementation, an ultrasonic sensor pixel array 235 (e.g., the ultrasonic sensor stack 105 shown in FIG. 1) includes sixteen ultrasonic sensor pixel(s) 234 arranged in a 4×4 array for an ultrasonic sensor. Each ultrasonic sensor pixel 234 may be associated/coupled with a local region of piezoelectric sensor material (PSM) and may include a sensor pixel circuit 236 that includes a peak detection diode D201 and a readout transistor M203. Many or all of these elements may be formed on or in a common substrate to form each sensor pixel circuit 236. In operation, the local region of PSM of each ultrasonic sensor pixel 234 may transduce received ultrasonic energy into electrical charges. For example, the piezoelectric layer of a PMUT included in the ultrasonic transceiver layer 101 as shown in FIG. 1 may correspond to a PSM. The peak detection diode D201 may register the maximum amount of charge (the "peak charge") detected by the local region of PSM. Each row of the ultrasonic sensor pixel array 235 may then be scanned, e.g., through a row select mechanism, a gate driver, or a shift register. Each readout transistor M203 may be triggered to allow the magnitude of the peak charge for each ultrasonic sensor pixel 234 to be read by additional circuitry, e.g., a multiplexer and ADC 241 of pixel readout electronics 240. The sensor pixel circuit 236 may include one or more TFTs (not illustrated) to allow gating, addressing, and resetting of the ultrasonic sensor pixel 234. Each ultrasonic sensor pixel 234 may include a PMUT element that may serve as an ultrasonic receiver and/or an ultrasonic transmitter. Each PMUT element in a PMUT sensor array may be associated with a respective sensor pixel circuit 236 in the ultrasonic sensor pixel array 235. Pixel input electrode 237 of the sensor pixel circuit 236 may be used to make an electrical connection with one or more electrodes in an overlying PMUT element.

Each sensor pixel circuit 236 may provide information about a small portion of the object detected by the ultrasonic sensor system 100. While, for convenience of illustration, the example shown in FIG. 2 is of a simple 4×4 array, ultrasonic sensors having a resolution on the order of 500 pixels per inch or higher may be configured with an appropriately scaled structure. The detection area of the ultrasonic sensor system 100 may be selected depending on the intended object of detection. For example, the detection area may range from about 5 mm×5 mm for a single finger to about 80 mm×80 mm for four fingers. Smaller and larger areas, including square, rectangular, and non-rectangular geometries, may be used as appropriate, depending on the characteristics of the object to be detected.

Figure 3:
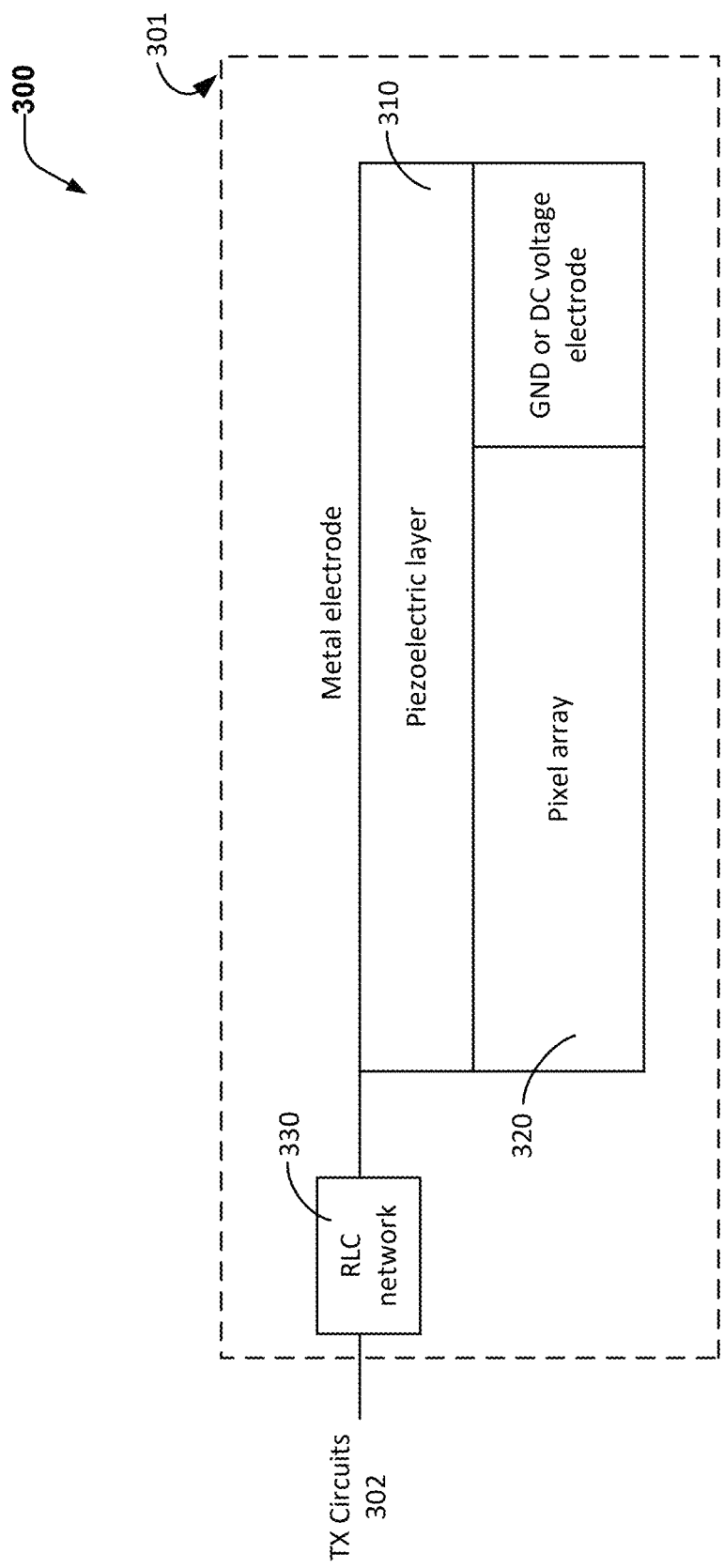
FIG. 3 is a simplified diagram showing example components of an ultrasonic sensor system.

FIG. 3 is a simplified diagram 300 ("diagram 300" hereinafter) illustrating example components of the receiver (RX) circuits 301 of the ultrasonic sensor system 100 illustrated in FIG. 1. As shown in FIG. 3, diagram 300 may include a piezoelectric layer 310 (e.g., corresponding to the piezoelectric layer within the ultrasonic transceiver layer 101 shown in FIG. 1 and/or the PSM shown in FIG. 2) and the pixel array 320 (e.g., corresponding the ultrasonic sensor stack 105 shown in FIG. 1 and/or the ultrasonic sensor pixel array 235 shown in FIG. 2), electrically connecting a metal electrode and a ground or DC voltage electrode (e.g., corresponding to the electrode(s) discussed above). The additional elements of RX circuit 301 are collectively represented in diagram 300 as an RLC network 330, which symbolizes the combined electrical properties of the omitted layers and components, simplifying the complexity for clarity within this illustration. The RX circuit 301 may be connected to a transmitter (TX) circuit 302 and used during the TX operation of the system.

As discussed above, ultrasonic fingerprint sensors may detect fingerprints by transmitting ultrasonic waves through the TFT layer (e.g., the TFT layer 102 in FIG. 1) and the layer(s) of the transmission enhancement layer (e.g., the transmission enhancement layer 103), and detecting the reflection of the ultrasonic waves that are caused by acoustic impedance contrast at (or near) the interface between the outer surface of a cover of the ultrasonic fingerprint sensor and whatever is in contact with the outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.").

To achieve the desired level of sensitivity, the electronic components of the sensor system may amplify the detection signal component. However, as noted above, in ultrasonic fingerprint sensors with foldable displays, the acoustic signal tends to become trapped within the layers of the foldable display stack (e.g., the foldable display stack in FIG. 1), resulting in a lowered SNR. When the signal is amplified for better detection, the common mode signal, which is the unwanted noise present along with the actual fingerprint signal (e.g., the detection signal component indicative of a fingerprint pattern), is also amplified. As the ADC (e.g., the ADC in the multiplexer and ADC 241 in FIG. 2) has a finite range over which it can convert analog signals to digital values, known as its dynamic range, if the amplified signal, now containing a strong common mode component, exceeds the dynamic range of the ADC, the ADC cannot accurately represent the peaks of the signal, leading to saturation. This impairs the system's ability to accurately process fingerprint data and, thus, negatively impacts the system's sensing performance.

Figure 4:
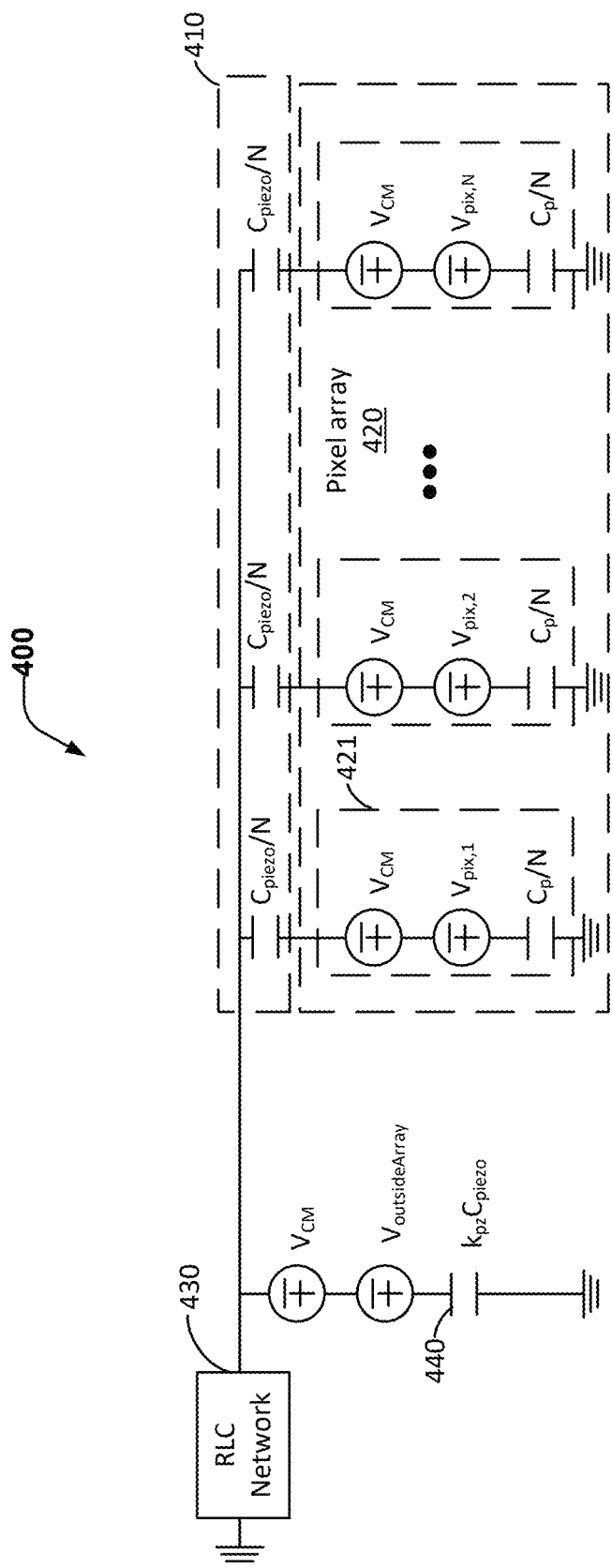
FIG. 4 is an electrical diagram showing an example ultrasonic sensor system with a common mode canceling capacitive element, according to some embodiments.
Figure 5B:
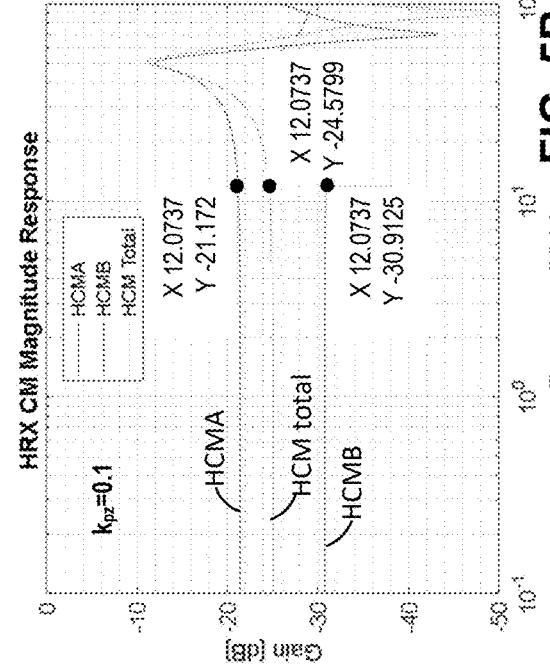
FIGS. 5A-5D illustrate how a predetermined ratio between the capacitance of the piezoelectric capacitor to the capacitance of the piezoelectric layer affects the common mode signal in the ultrasonic sensor system, according to some embodiments.
Figure 5D:
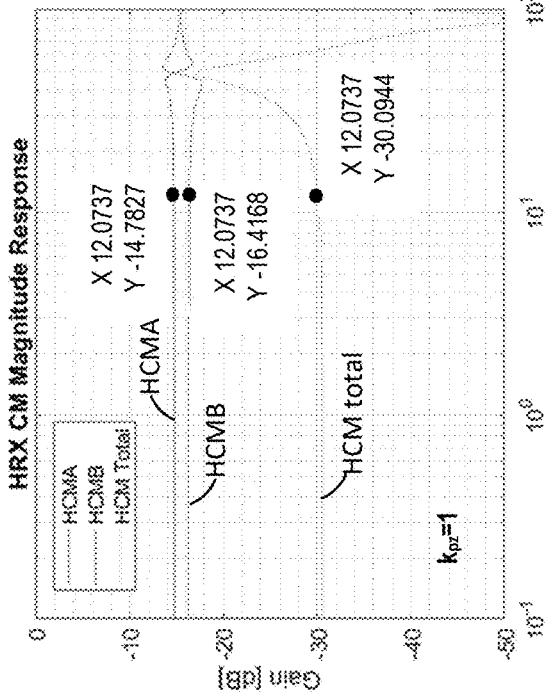
Figure 5A:
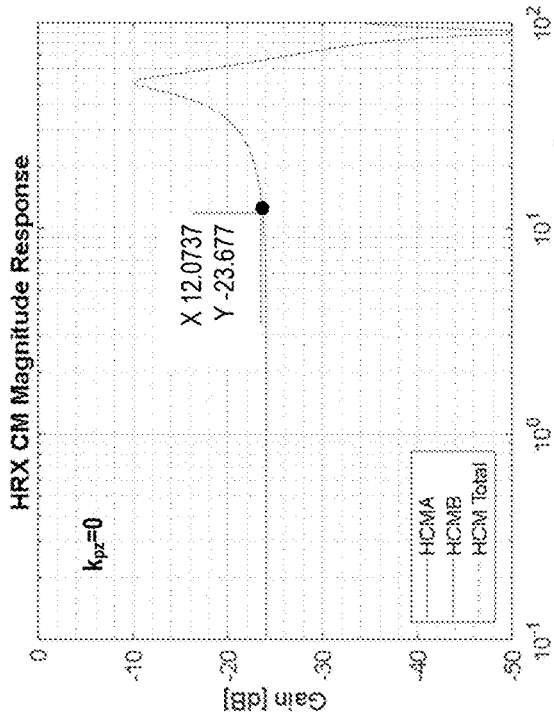
Figure 5C:
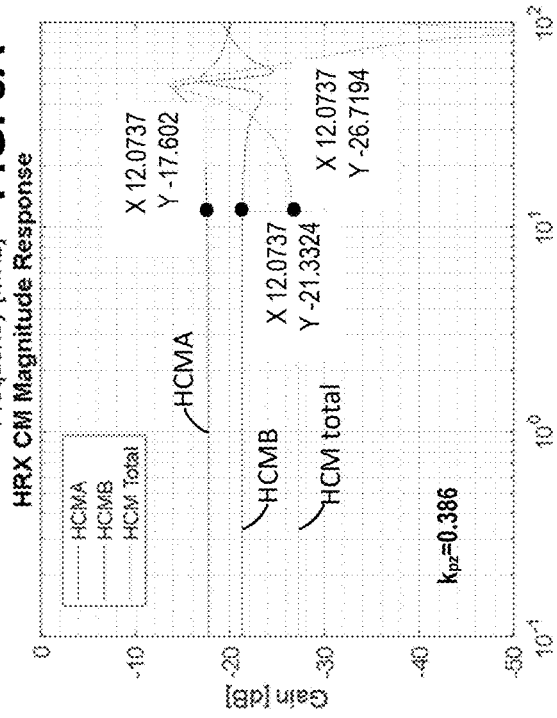

To resolve the above-discussed issue, one or more common mode canceling components may be introduced to the ultrasonic sensor system to mitigate or even cancel the common mode signal component in the detected acoustic signal. For example, FIG. 4 is an electrical diagram showing an example ultrasonic sensor system 400 with a common mode canceling capacitive element, according to some embodiments. As shown in FIG. 4, the ultrasonic sensor system 400, configured to obtain an acoustic signal (e.g., the reflection of the ultrasonic waves) that includes a common mode component and a detection signal component indicative of a fingerprint pattern, may include a piezoelectric layer 410 (e.g., corresponding to the piezoelectric layer 310 in FIG. 3), a pixel array 420 (e.g., corresponding to the pixel array 320 in FIG. 3), and a RLC network 430 (e.g., corresponding to the RLC network 330 and the TX circuits 302 in FIG. 3). The pixel array 420 may include an array of N ultrasonic sensor pixel 421. Each ultrasonic sensor pixel 421 is coupled with a portion of the piezoelectric layer 410 and is configured to detect a portion of the detection signal component.

As shown in FIG. 4, $C_{piezo}$ denotes the capacitance of the piezoelectric layer 410, and $C_{piezo}/N$ denotes the capacitance of the portion of the piezoelectric layer 410 coupled with each ultrasonic sensor pixel 421. $C_p/N$ denotes the equivalent capacitance of the components on each ultrasonic sensor pixel 421. $V_{CM}$ denotes the common mode signal (e.g., the common mode component of the acoustic signal). $V_{pix,1}$ to $V_{pix,N}$ denote the portion of the detection signal component detected by ultrasonic sensor pixel 1 to ultrasonic sensor pixel N, respectively. $V_{outsideArray}$ collectively represents the signal components outside the pixel array 420, in addition to the common mode signal $V_{CM}$.

As illustrated in FIG. 4, to mitigate or even cancel the common mode signal component in the detected acoustic signal, a common mode canceling capacitive element may be added to the ultrasonic sensor system 400 to passively cancel the common mode signal (e.g., common mode signal cancellation in a passive mode). For example, the common mode canceling capacitive element may include a piezoelectric capacitor 440 having a capacitance that is at a predetermined ratio $k_{pz}$ to a capacitance of the piezoelectric layer and may electrically couple with the RLC network 430 in parallel with the pixel array 420. In this configuration, the piezoelectric capacitor 440 may attenuate at least a portion of the common mode component from the acoustic signal before the acoustic signal is received by the pixel array 420. Specifically, with a specifically designed predetermined ratio $k_{pz}$, the common mode signal component in the detected acoustic signal can be largely mitigated.

For example, FIGS. 5A-5D illustrate how the predetermined ratio $k_{pz}$ between the capacitance of the piezoelectric capacitor 440 to the capacitance of the piezoelectric layer 410 affects the common mode signal in the ultrasonic sensor system, according to some embodiments. In FIGS. 5A-5D, $HCM_A$ denotes the transfer function from the common mode signal $V_{CM}$ to the RX voltage from inside the pixel array 420. $HCM_B$ denotes the transfer function from the common mode signal $V_{CM}$ to the RX voltage from outside the pixel array 420. $HCM_{Total}$ denotes the difference between $HCM_A$ and $HCM_B$ (e.g., $HCM_{total}=HCM_A-HCM_B$), which may indicate the value of the common mode signal. As shown in FIGS. 5A-5D, as the predetermined ratio $k_{pz}$ increases (e.g., from 0 to 1), $HCM_A$ and $HCM_B$ both increase but converge (e.g., getting closer in value). Therefore, $HCM_{Total}$ reduces, indicating the common mode signal reduces as the predetermined ratio $k_{pz}$ increases from 0 to 1. It is understood that the predetermined ratio $k_{pz}$ provided here is solely for illustrating how $k_{pz}$ can affect the cancellation of the common mode signal. No specific value or range of values for $k_{pz}$ is indicated. Any other suitable $k_{pz}$ values may be applied according to the desired performance.

Figure 6:
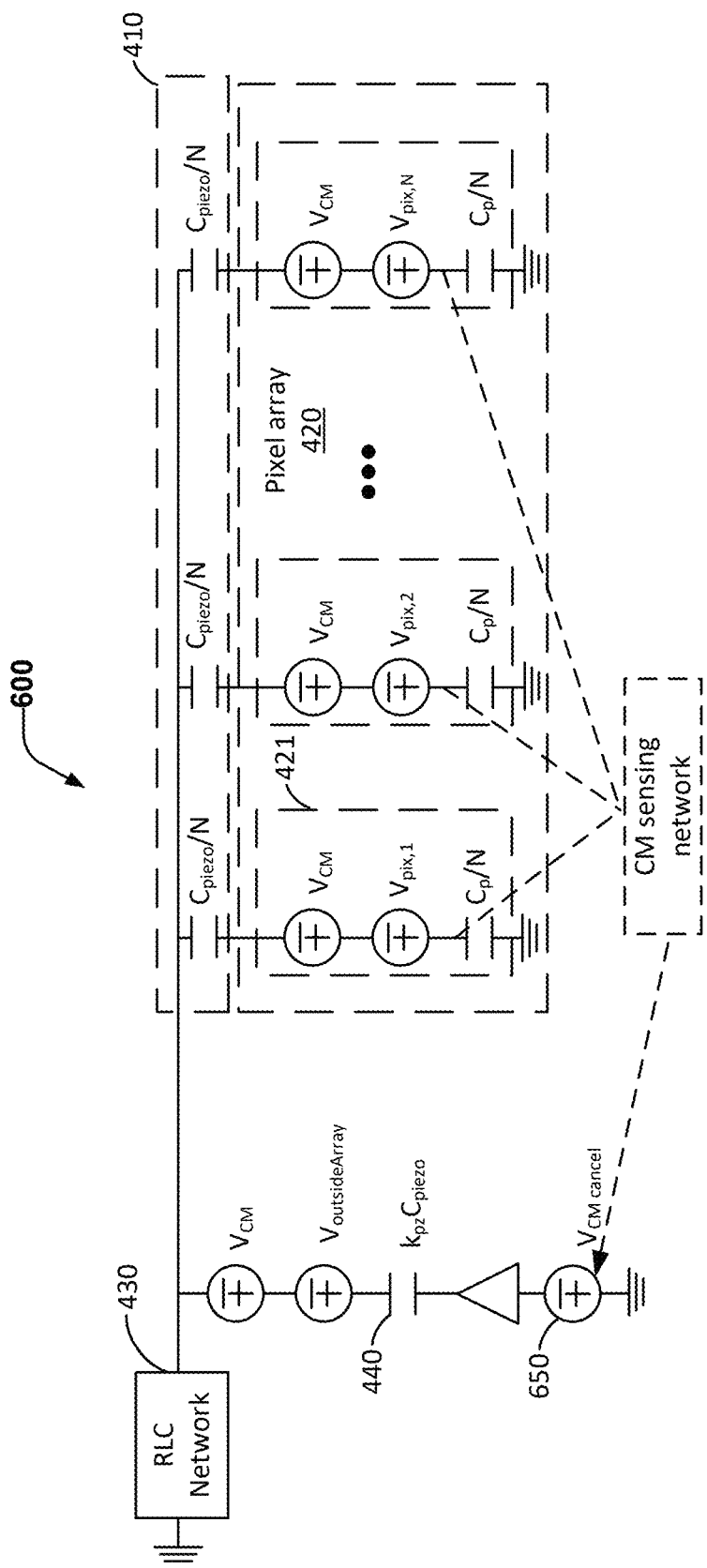
FIG. 6 is an electrical diagram showing an example ultrasonic sensor system with a common mode canceling capacitive element, according to some embodiments.

Additionally, or alternatively, a feedback signal may be introduced to actively cancel the common mode signal (e.g., common mode signal cancellation in an active mode). For example, FIG. 6 is an electrical diagram showing an example ultrasonic sensor system with a common mode canceling capacitive element, according to some embodiments. Similar to the ultrasonic sensor system 400 in FIG. 4, the ultrasonic sensor system 600 may include the piezoelectric layer 410, the pixel array 420, and the RLC network 430. Different from the ultrasonic sensor system 400, the ultrasonic sensor system 600 may additionally introduce a feedback signal 650 to the piezoelectric capacitor 440 to further cancel the common mode signal. In some embodiments, a common mode sensing network may be used to sense the common mode signal detected on each ultrasonic sensor pixel 421. The common mode signal detected on each ultrasonic sensor pixel 421 may then be fed back to the piezoelectric capacitor 440 to generate the feedback signal 650, further canceling the common mode signal. In some embodiments, the feedback signal 650 may have an opposite phase to that of the common mode component in the received acoustic signal at each ultrasonic sensor pixel 421 to cancel out the common mode signal.

In some embodiments, the common mode sensing network introducing the feedback signal 650 may include an open-loop network or a closed-loop network. That said, the feedback signal 650 may be introduced using an open-loop mechanism or a closed-loop mechanism. For example, in cases where the feedback signal 650 is introduced using an open-loop network, the parameters of the open-loop network need to be calibrated to account for potential drift. Additionally, or alternatively, in cases where the feedback signal 650 is introduced using a closed-loop network, an initial feedback signal (e.g., the common mode signal without cancellation) can be first measured at each ultrasonic sensor pixel 421 using suitable methods. The initial feedback signal may then be set (e.g., setting the phase and amplitude) to generate the feedback signal 650 to cancel the common mode signal. When determining the parameters of the closed-loop network, the stability of the overall system under all possible conditions needs to be ensured.

Figure 7:
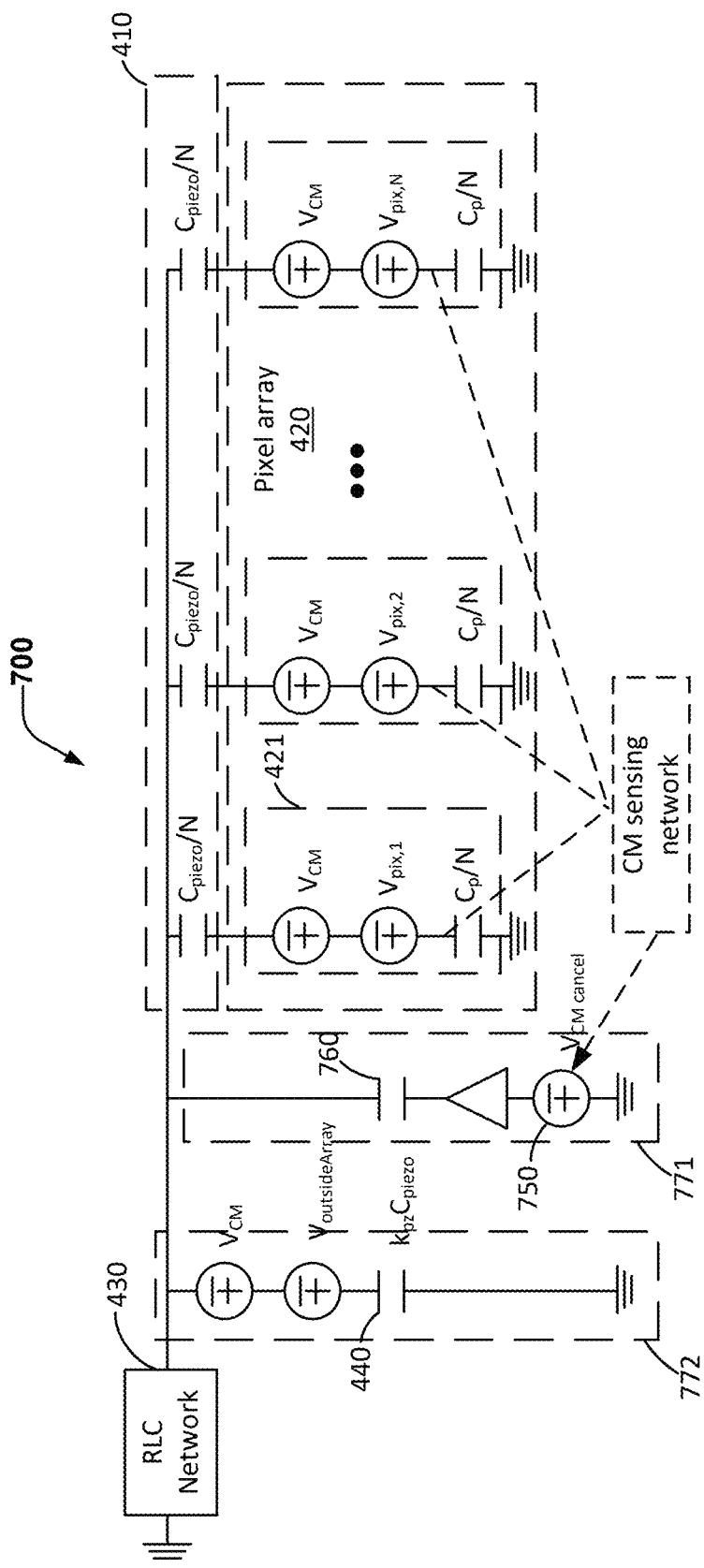
FIG. 7 is an electrical diagram showing an example ultrasonic sensor system with a common mode canceling capacitive element, according to some embodiments.

Additionally or alternatively, in some embodiments, the feedback signal 650 may be introduced to actively cancel the common mode signal through a separate common mode canceling capacitive element, different from the piezoelectric capacitor 440 in FIG. 4. For example, FIG. 7 is an electrical diagram showing example ultrasonic sensor system with a common mode canceling capacitive element, according to some embodiments. Similar to the ultrasonic sensor system 400 in FIG. 4, the ultrasonic sensor system 700 may include the piezoelectric layer 410, the pixel array 420, and the RLC network 430. Different from the ultrasonic sensor systems 400 and 600, the ultrasonic sensor system 700 may introduce a feedback signal 750 at a common mode canceling capacitive element 760 electrically coupled with the RLC network 430 in parallel with the pixel array 420. In some embodiments, the common mode canceling capacitive element 760 may include a piezoelectric capacitor, a non-piezoelectric capacitor, or any suitable components possessing predetermined capacitance.

Similar to the ultrasonic sensor system 600 in FIG. 6, in the ultrasonic sensor system 700, a common mode sensing network may be used to detect the common mode signal detected on each ultrasonic sensor pixel 421. In the ultrasonic sensor system 700, the common mode signal detected on each ultrasonic sensor pixel 421 may then be fed back to the common mode canceling capacitive element 760 to generate the feedback signal 750, further canceling the common mode signal. In some embodiments, the feedback signal 750 may have an opposite phase than that of the common mode component in the received acoustic signal at each ultrasonic sensor pixel 421. Similar to introducing the feedback signal 650 in the ultrasonic sensor system 600, the common mode sensing network introducing the feedback signal 750 may include an open-loop network or a closed-loop network. That said, the feedback signal 750 may be introduced in an open-loop mechanism or a closed-loop mechanism.

In some embodiments, the common mode canceling capacitive element 760 and the feedback signal 750 may be implemented with or without the piezoelectric capacitor 440. That said, an electrical branch 771, including using the common mode canceling capacitive element 760 for introducing the feedback signal 750, may be applied additionally or alternatively to an electrical branch 772 that includes the piezoelectric capacitor 440.

Figure 8:
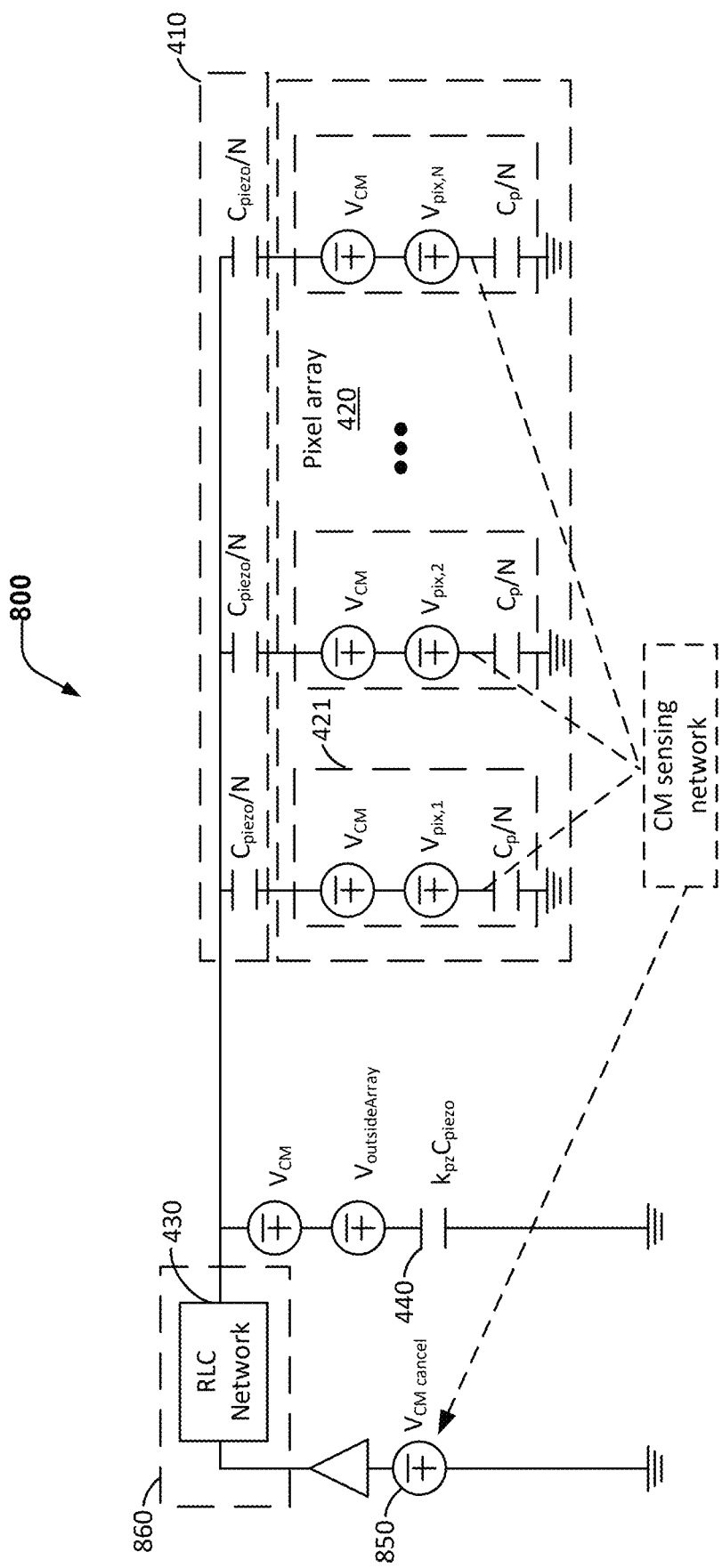
FIG. 8 is an electrical diagram showing an example ultrasonic sensor system with a common mode canceling circuitry, according to some embodiments.

Additionally, or alternatively, in some embodiments, the feedback signal 650 or 750 may be introduced to actively cancel the common mode signal through a common mode canceling circuitry (e.g., common mode signal cancellation in an active mode). For example, FIG. 8 is an electrical diagram showing an example ultrasonic sensor system with a common mode canceling circuitry, according to some embodiments. Similar to the ultrasonic sensor system 400 in FIG. 4, the ultrasonic sensor system 800 may include the piezoelectric layer 410, the pixel array 420, and the RLC network 430. Unlike the ultrasonic sensor systems 400, 600, and 700, the ultrasonic sensor system 800 may introduce a feedback signal 850 through common mode canceling circuitry 860, which is coupled with the RLC network 430 at an end opposite from the pixel array 420. In some embodiments, the common mode canceling circuitry 860 may consist of the RLC network 430 itself (which may also include the TX circuits), or it could comprise any suitable RLC networks with predetermined parameters in addition to the RLC network 430.

Similar to the ultrasonic sensor systems 600 and 700 in FIGS. 6 and 7, respectively, in the ultrasonic sensor system 800, a common mode sensing network may be used to detect the common mode signal detected on each ultrasonic sensor pixel 421. In the ultrasonic sensor system 800, the common mode signal detected on each ultrasonic sensor pixel 421 may then be fed back to the common mode canceling circuitry 860 to generate the feedback signal 850 to further cancel the common mode signal. In some embodiments, the feedback signal 850 may have an opposite phase than that of the common mode component in the received acoustic signal at each ultrasonic sensor pixel 421. Similar to introducing the feedback signal 650 in FIG. 6 and the feedback signal 750 in FIG. 7, the common mode sensing network introducing the feedback signal 850 may include an open-loop network or a closed-loop network. That said, the feedback signal 850 may be introduced in an open-loop or closed-loop mechanism. In some embodiments, when introducing the feedback signal 850, the parameters of the common mode sensing network and the common mode canceling circuitry 860 may be determined with considerations for the resonant properties of the circuit.

In some embodiments, the common mode canceling circuitry 860 and the feedback signal 850 may be implemented with or without the piezoelectric capacitor 440.

After the common mode signal is canceled, the SNR of the detected acoustic signal may be significantly improved upon reaching the TFT layer (e.g., TFT layer 102 in FIG. 1) for further processing. Consequently, the pre-processed acoustic signal can then be processed to generate data that more accurately indicates the fingerprint pattern, thereby enhancing detectability.

Figure 9:
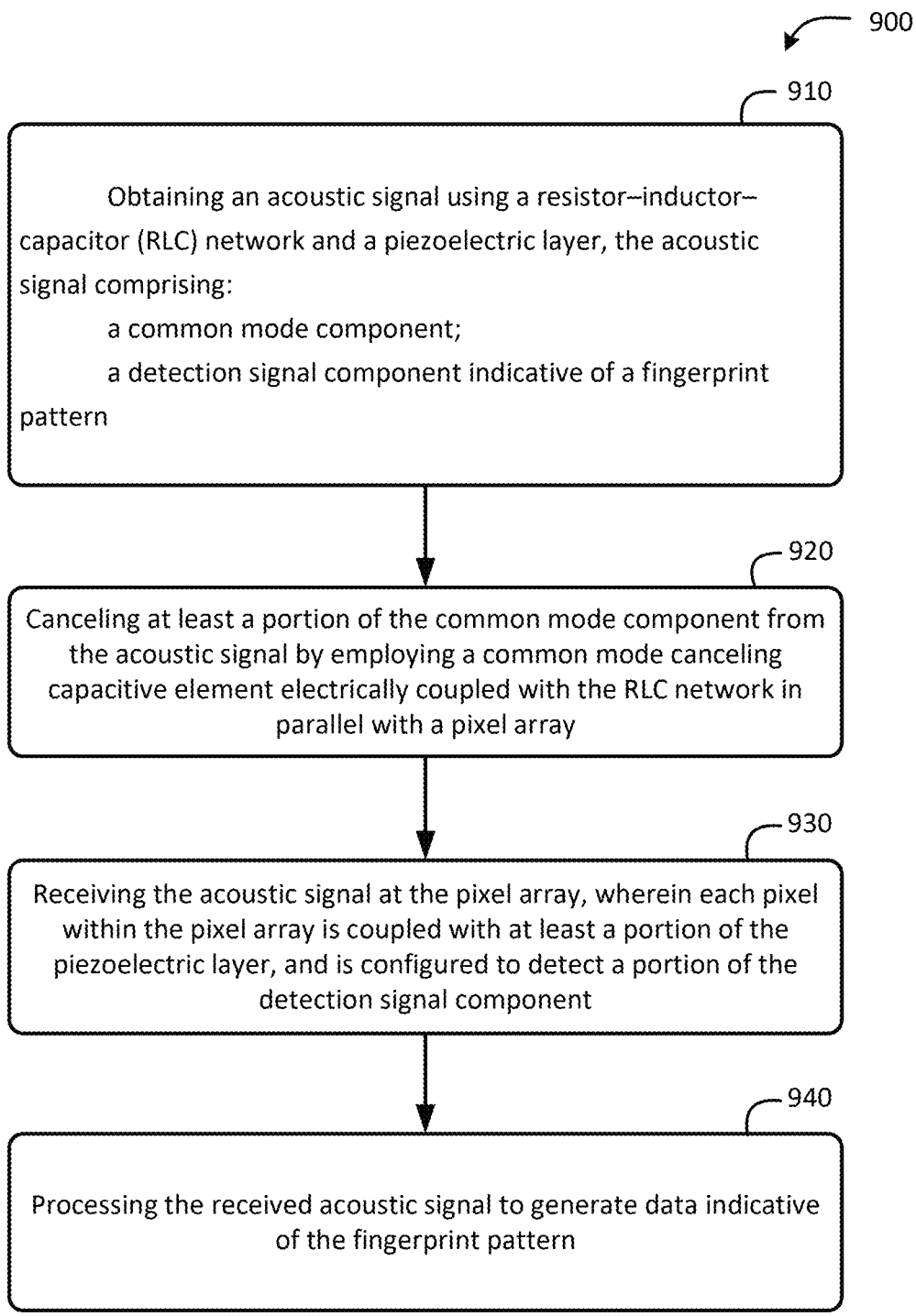
FIG. 9 is a flow diagram of a method of canceling a common mode signal in an ultrasonic sensor system, according to some embodiments.

FIG. 9 is a flow diagram of a method of canceling a common mode signal in an ultrasonic sensor system, according to some embodiments. The ultrasonic sensor system performing method 900 may correspond to the ultrasonic sensor systems 400, 600, and/or 700, as discussed above. Means for performing the functionality illustrated in one or more of the blocks shown in FIG. 9 may be performed by hardware and/or software components of an ultrasonic sensor system. Example components of an ultrasonic sensor system are illustrated in FIGS. 1 and 2 above.

At block 910, the method 900 may comprise obtaining an acoustic signal using a RLC network (e.g., the RLC network 430 in FIG. 4, 6, or 7) and a piezoelectric layer (e.g., the piezoelectric layer 410 in FIG. 4, 6, or 7). The acoustic signal may include a common mode component and a detection signal component indicative of a fingerprint pattern.

At block 920, the method 900 may comprise canceling at least a portion of the common mode component from the acoustic signal by employing a common mode canceling capacitive element (e.g., the piezoelectric capacitor 440 in FIG. 4, 6, or 7, or the common mode canceling capacitive element in 760 in FIG. 7) electrically coupled with the RLC network in parallel with a pixel array (e.g., the pixel array 420 in FIG. 4, 6, or 7).

At block 930, the method 900 may comprise receiving the acoustic signal at the pixel array, wherein each pixel (e.g., the ultrasonic sensor pixel 421 in FIG. 4, 6, or 7) within the pixel array is coupled with at least a portion of the piezoelectric layer and is configured to detect a portion of the detection signal component.

At block 940, the method 900 may comprise processing the received acoustic signal to generate data indicative of the fingerprint pattern. Means for performing functionality at block 940 may also comprise the multiplexer and ADC 241 of pixel readout electronics 240 shown in FIG. 2, the TFT layer 102, the control system 106, the interface system 107, and the foldable display stack 11 shown in FIG. 1, and/or other components of an ultrasonic sensor system, such as those as illustrated in FIGS. 1 and 2 and described above.

In some embodiments, the common mode canceling capacitive element comprises a piezoelectric capacitor having a capacitance that is at a predetermined ratio to a capacitance of the piezoelectric layer, as discussed with respect to FIG. 4.

In some embodiments, the common mode canceling capacitive element is further configured to receive a feedback signal determined based on the received acoustic signal at each pixel within the pixel array, as discussed with respect to FIG. 6.

In some embodiments, the feedback signal has an opposite phase than the common mode component in the received acoustic signal at each pixel within the pixel array.

In some embodiments, the feedback signal is introduced to the common mode canceling capacitive element using an open-loop network.

In some embodiments, the feedback signal is introduced to the common mode canceling capacitive element using a closed-loop network.

In some embodiments, the method 900 may further comprise canceling at least a portion of the common mode component from the acoustic signal by employing a piezoelectric capacitor having a capacitance that is at a predetermined ratio to a capacitance of the piezoelectric layer, wherein the piezoelectric capacitor is connected to the RLC network in parallel with the pixel array and the common mode canceling capacitive element, as discussed with respect to FIG. 7.

Figure 10:
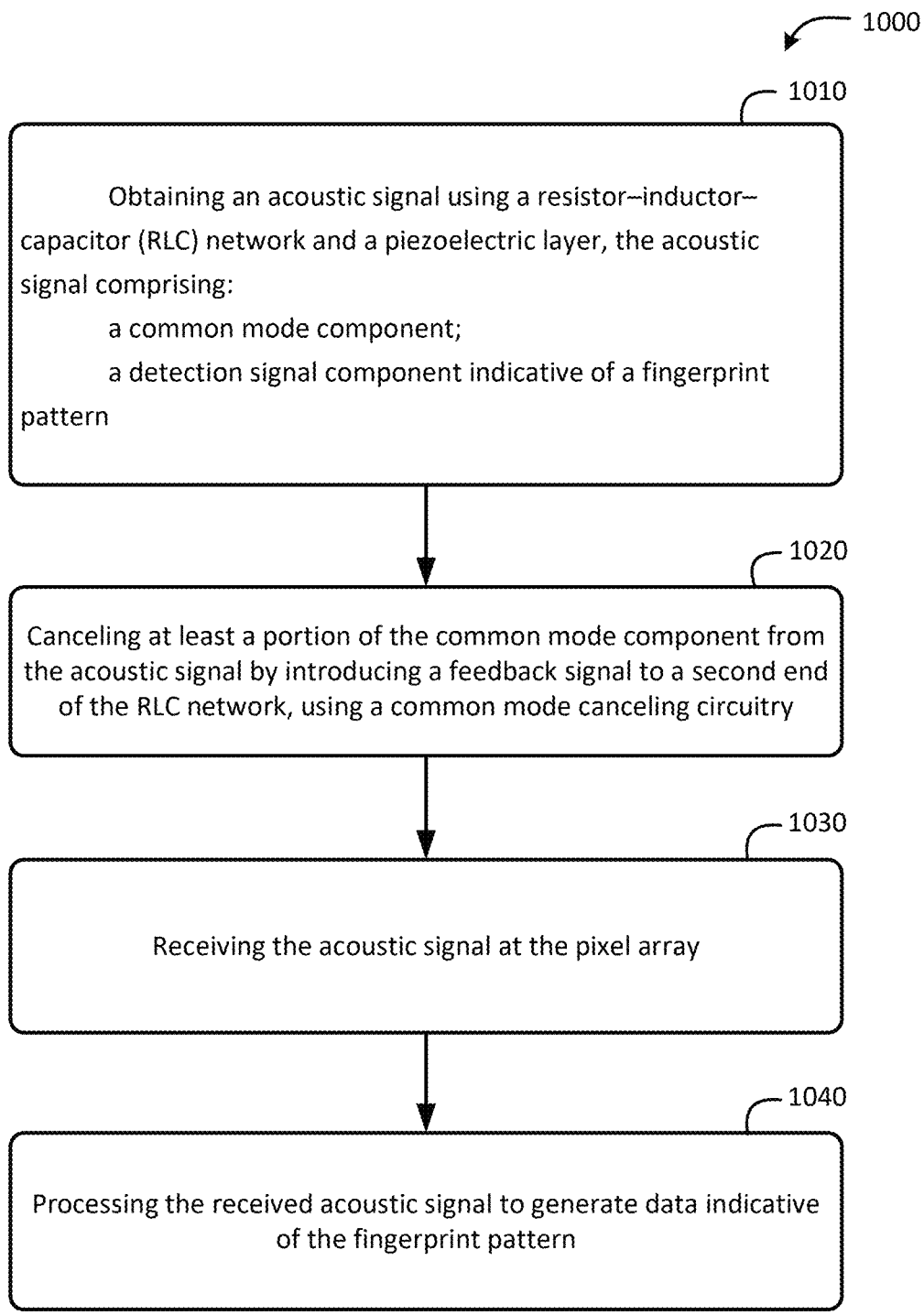
FIG. 10 is a flow diagram of a method of canceling a common mode signal in an ultrasonic sensor system, according to some embodiments.

FIG. 10 is a flow diagram of a method of canceling a common mode signal in an ultrasonic sensor system, according to some embodiments. The ultrasonic sensor system may correspond to the ultrasonic sensor system 800 as discussed above. Means for performing the functionality illustrated in one or more of the blocks shown in FIG. 10 may be performed by hardware and/or software components of an ultrasonic sensor system. Example components of an ultrasonic sensor system are illustrated in FIGS. 1 and 2 above.

At block 1010, the method 1000 may comprise obtaining an acoustic signal using a RLC network (e.g., the RLC network 430 in FIG. 8) and a piezoelectric layer (e.g., the piezoelectric layer 410 in FIG. 8). The acoustic signal may include a common mode component and a detection signal component indicative of a fingerprint pattern. The acoustic signal is configured to be received by a pixel array (e.g., the pixel array 420 in FIG. 8) connected to a first end of the RLC network, wherein each pixel within the pixel array is coupled with at least a portion of the piezoelectric layer and is configured to detect a portion of the detection signal component.

At block 1020, the method 1000 may comprise canceling at least a portion of the common mode component from the acoustic signal by introducing a feedback signal to a second end of the RLC network, using a common mode canceling circuitry (e.g., the common mode canceling circuitry 860 in FIG. 8). The feedback signal is determined based on the received acoustic signal at each pixel within the pixel array.

At block 1030, the method 1000 may comprise receiving the acoustic signal at the pixel array.

At block 1040, the method 1000 may comprise processing the received acoustic signal to generate data indicative of the fingerprint pattern. Means for performing functionality at block 1040 may also comprise the multiplexer and ADC 241 of pixel readout electronics 240 in FIG. 2, the TFT layer 102, the control system 106, the interface system 107, and the foldable display stack 11 in FIG. 1, and/or other components of an ultrasonic sensor system, such as those as illustrated in FIGS. 1 and 2 and described above.

In some embodiments, the common mode canceling circuitry may include the RLC network.

Figure 11:
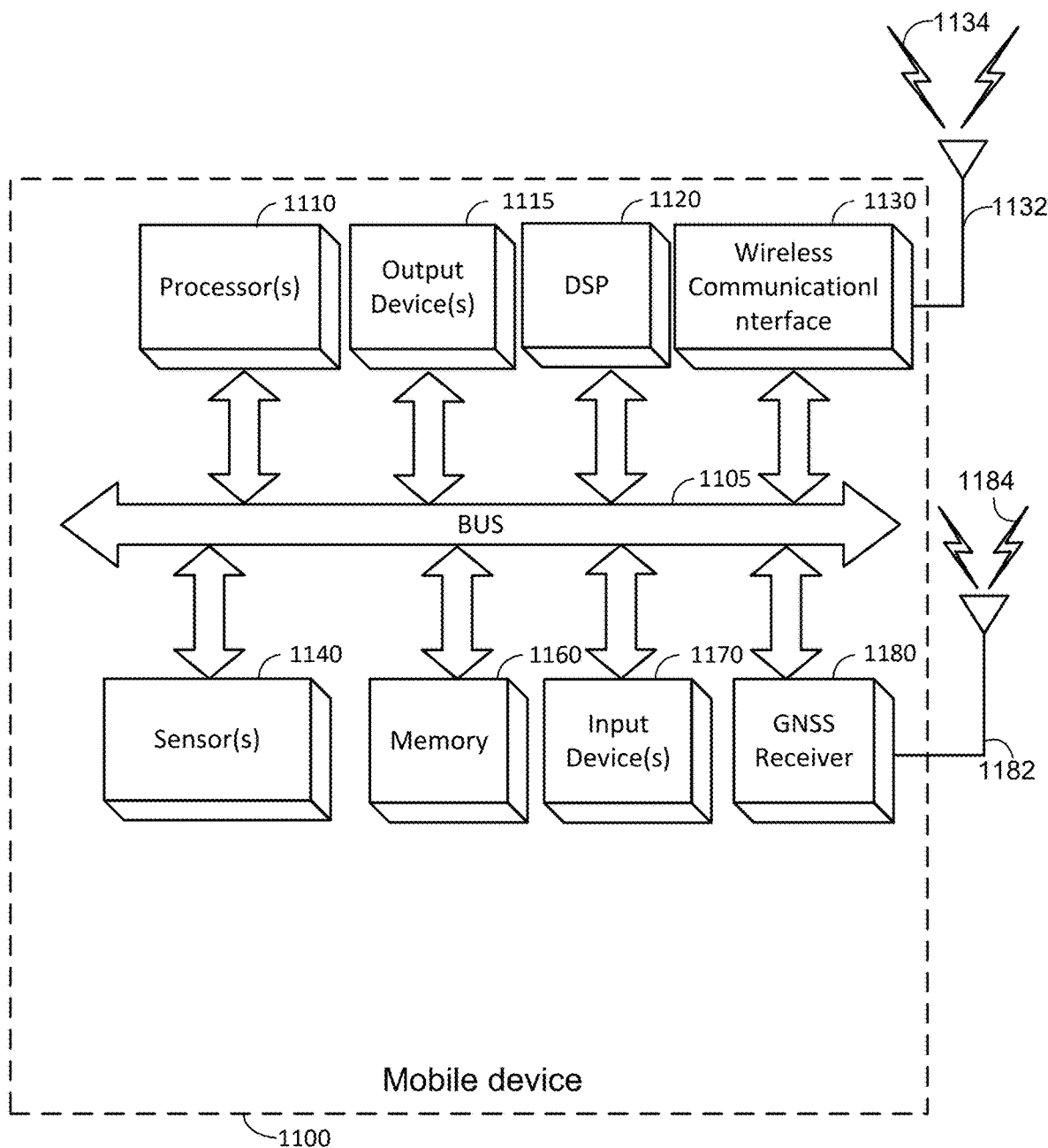
FIG. 11 is a block diagram of an embodiment of a UE, which can be utilized in embodiments as described herein.

FIG. 11 is a block diagram of an embodiment of a mobile device 1100, which can be utilized as described herein above (e.g., incorporating the ultrasonic sensor system discussed above). It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the sensing device discussed in the previously described embodiments may be executed by one or more of the hardware and/or software components illustrated in FIG. 11.

The mobile device 1100 is shown comprising hardware elements that can be electrically coupled via a bus 1105 (or may otherwise be in communication, as appropriate). The hardware elements may include a processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The mobile device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1100 to communicate with other devices as described in the embodiments above. The wireless communication interface 1130 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1100 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), ultrasonic sensor systems discussed above, and the like), some of which may be used to obtain position-related measurements and/or other information.

Embodiments of the mobile device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the mobile device 1100, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1110, DSP 1120, and/or a processor within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1110 or DSP 1120.

The mobile device 1100 may further include and/or be in communication with a memory 1160. The memory 1160 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile device 1100 (and/or processor(s) 1110 or DSP 1120 within mobile device 1100). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware may also be used and/or particular elements may be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media may be involved in providing instructions/code to processors and/or other device(s) for execution. Additionally, or alternatively, the machine-readable media may be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example apparatus may comprise a resistor-inductor-capacitor (RLC) network and a piezoelectric layer. The RLC network and the piezoelectric layer may be configured to obtain an acoustic signal that comprises a common mode component and a detection signal component indicative of a fingerprint pattern. The apparatus may also comprise a pixel array electrically coupled with the RLC network at a first end of the RLC network and configured to receive the acoustic signal. Each pixel within the pixel array may be coupled with at least a portion of the piezoelectric layer and may be configured to detect a portion of the detection signal component. The apparatus may further comprise either: (A) a common mode canceling capacitive element electrically coupled with the RLC network in parallel with the pixel array and configured to attenuate at least a portion of the common mode component from the acoustic signal before the acoustic signal is received by the pixel array, or (B) a common mode canceling circuitry electrically coupled with the RLC network at a second end of the RLC network and configured to introduce a feedback signal to the pixel array through the RLC network, where the feedback signal may be determined based on the received acoustic signal at each pixel within the pixel array.

Clause 2. The apparatus of clause 1, comprising the common mode canceling capacitive element, wherein the common mode canceling capacitive element comprises a piezoelectric capacitor having a capacitance that is at a predetermined ratio to a capacitance of the piezoelectric layer.

Clause 3. The apparatus of clause 1 or 2, comprising the common mode canceling capacitive element, wherein the common mode canceling capacitive element is further configured to receive the feedback signal.

Clause 4. The apparatus of any of clauses 1-3, wherein the feedback signal has an opposite phase than that of the common mode component in the received acoustic signal at each pixel within the pixel array.

Clause 5. The apparatus of any of clauses 1-4, wherein the feedback signal is introduced to the common mode canceling capacitive element using an open-loop network.

Clause 6. The apparatus of any of clauses 1-5, wherein the feedback signal is introduced to the common mode canceling capacitive element using a closed-loop network.

Clause 7. The apparatus of any of clauses 1-6, further comprising: a piezoelectric capacitor connected to the RLC network in parallel with the pixel array and the common mode canceling capacitive element, wherein the piezoelectric capacitor has a capacitance that is at a predetermined ratio to a capacitance of the piezoelectric layer.

Clause 8. The apparatus of any of clauses 1-7, wherein the common mode canceling capacitive element comprises a piezoelectric capacitor having a capacitance that is at a predetermined ratio to a capacitance of the piezoelectric layer.

Clause 9. The apparatus of any of clauses 1-8, comprising the common mode canceling circuitry, and wherein the feedback signal has an opposite phase than the received acoustic signal at each pixel within the pixel array.

Clause 10. The apparatus of any of clauses 1-9, further comprising the common mode canceling capacitive element that comprises a piezoelectric capacitor having a capacitance that is at a predetermined ratio to a capacitance of the piezoelectric layer.

Clause 11. The apparatus of any of clauses 1-10, wherein the common mode canceling circuitry comprises the RLC network.

Clause 12. An example method for common mode noise cancellation in an ultrasonic fingerprint sensor, the method may comprise obtaining an acoustic signal using a RLC network and a piezoelectric layer. The acoustic signal may comprise a common mode component and a detection signal component indicative of a fingerprint pattern. The method may also comprise canceling at least a portion of the common mode component from the acoustic signal by employing a common mode canceling capacitive element that is electrically coupled with the RLC network in parallel with a pixel array. The method may further comprise receiving the acoustic signal at the pixel array, where each pixel within the pixel array is coupled with at least a portion of the piezoelectric layer and is configured to detect a portion of the detection signal component. The method may yet comprise processing the received acoustic signal to generate data indicative of the fingerprint pattern.

Clause 13. The method of clause 12, wherein the common mode canceling capacitive element comprises a piezoelectric capacitor having a capacitance that is at a predetermined ratio to a capacitance of the piezoelectric layer.

Clause 14. The method of clause 12 or 13, wherein the common mode canceling capacitive element is further configured to receive a feedback signal determined based on the received acoustic signal at each pixel within the pixel array.

Clause 15. The method of any of clauses 12-14, wherein the feedback signal has an opposite phase than that of the common mode component in the received acoustic signal at each pixel within the pixel array.

Clause 16. The method of any of clauses 12-15, wherein the feedback signal is introduced to the common mode canceling capacitive element using an open-loop mechanism.

Clause 17. The method of any of clauses 12-16, wherein the feedback signal is introduced to the common mode canceling capacitive element using a closed-loop mechanism.

Clause 18. An example method for common mode noise cancellation in an ultrasonic fingerprint sensor, the method may comprise obtaining an acoustic signal using a resistor-inductor-capacitor (RLC) network and a piezoelectric layer. The acoustic signal may comprise a common mode component and a detection signal component indicative of a fingerprint pattern. The acoustic signal may be configured to be received by a pixel array connected to a first end of the RLC network, wherein each pixel within the pixel array is coupled with at least a portion of the piezoelectric layer and is configured to detect a portion of the detection signal component. The method may further comprise canceling at least a portion of the common mode component from the acoustic signal by introducing a feedback signal to a second end of the RLC network using a common mode canceling circuitry, where the feedback signal may be determined based on the received acoustic signal at each pixel within the pixel array. The method may yet comprise receiving the acoustic signal at the pixel array. The method may yet comprise processing the received acoustic signal to generate data indicative of the fingerprint pattern.

Clause 19. The method of clause 18, wherein the feedback signal has an opposite phase than that of the common mode component in the received acoustic signal at each pixel within the pixel array.

Clause 20. The method of clause 18 or 19, wherein the common mode canceling circuitry comprises a piezoelectric capacitor having a capacitance that is at a predetermined ratio to a capacitance of the piezoelectric layer.

What is claimed is:

1. An apparatus, comprising:
   a resistor-inductor-capacitor (RLC) network;
   a piezoelectric layer, wherein the RLC network and the piezoelectric layer are configured to obtain an acoustic signal comprising:
      a common mode component;
      a detection signal component indicative of a fingerprint pattern;
   a pixel array electrically coupled with the RLC network at a first end of the RLC network and configured to receive the acoustic signal, wherein each pixel within the pixel array is coupled with at least a portion of the piezoelectric layer, and is configured to detect at least a portion of the detection signal component; and
   either:
      (A) a common mode canceling capacitive element electrically coupled with the RLC network in parallel with the pixel array and configured to attenuate at least a portion of the common mode component from the acoustic signal before the acoustic signal is received by the pixel array, or
      (B) a common mode canceling circuitry electrically coupled with the RLC network at a second end of the RLC network and configured to introduce a feedback signal to the pixel array through the RLC network, wherein the feedback signal is determined based on the received acoustic signal at each pixel within the pixel array.

2. The apparatus of claim 1, comprising the common mode canceling capacitive element, wherein the common mode canceling capacitive element comprises a piezoelectric capacitor having a capacitance that is at a predetermined ratio to a capacitance of the piezoelectric layer.

3. The apparatus of claim 1, comprising the common mode canceling capacitive element, wherein the common mode canceling capacitive element is further configured to receive the feedback signal.

4. The apparatus of claim 3, wherein the feedback signal has an opposite phase than that of the common mode component in the received acoustic signal at each pixel within the pixel array.

5. The apparatus of claim 4, wherein the feedback signal is introduced to the common mode canceling capacitive element using an open-loop network.

6. The apparatus of claim 4, wherein the feedback signal is introduced to the common mode canceling capacitive element using a closed-loop network.

7. The apparatus of claim 3, further comprising:
   a piezoelectric capacitor connected to the RLC network in parallel with the pixel array and the common mode canceling capacitive element, wherein the piezoelectric capacitor has a capacitance that is at a predetermined ratio to a capacitance of the piezoelectric layer.

8. The apparatus of claim 3, wherein the common mode canceling capacitive element comprises a piezoelectric capacitor having a capacitance that is at a predetermined ratio to a capacitance of the piezoelectric layer.

9. The apparatus of claim 1, comprising the common mode canceling circuitry, and wherein the feedback signal has an opposite phase than the received acoustic signal at each pixel within the pixel array.

10. The apparatus of claim 9, further comprising the common mode canceling capacitive element that comprises a piezoelectric capacitor having a capacitance that is at a predetermined ratio to a capacitance of the piezoelectric layer.

11. The apparatus of claim 9, wherein the common mode canceling circuitry comprises the RLC network.

12. A method for common mode noise cancellation in an ultrasonic fingerprint sensor, the method comprising:
obtaining an acoustic signal using a resistor-inductor-capacitor (RLC) network and a piezoelectric layer, the acoustic signal comprising:
a common mode component;
a detection signal component indicative of a fingerprint pattern;
canceling at least a portion of the common mode component from the acoustic signal by employing a common mode canceling capacitive element that is electrically coupled with the RLC network in parallel with a pixel array;
receiving the acoustic signal at the pixel array, wherein each pixel within the pixel array is coupled with at least a portion of the piezoelectric layer, and is configured to detect a portion of the detection signal component; and
processing the received acoustic signal to generate data indicative of the fingerprint pattern.

13. The method of claim 12, wherein the common mode canceling capacitive element comprises a piezoelectric capacitor having a capacitance that is at a predetermined ratio to a capacitance of the piezoelectric layer.

14. The method of claim 12, wherein the common mode canceling capacitive element is further configured to receive a feedback signal determined based on the received acoustic signal at each pixel within the pixel array.

15. The method of claim 14, wherein the feedback signal has an opposite phase than that of the common mode component in the received acoustic signal at each pixel within the pixel array.

16. The method of claim 15, wherein the feedback signal is introduced to the common mode canceling capacitive element using an open-loop mechanism.

17. The method of claim 15, wherein the feedback signal is introduced to the common mode canceling capacitive element using a closed-loop mechanism.

18. A method for common mode noise cancellation in an ultrasonic fingerprint sensor, comprising:
obtaining an acoustic signal using a resistor-inductor-capacitor (RLC) network and a piezoelectric layer, the acoustic signal comprising:
a common mode component;
a detection signal component indicative of a fingerprint pattern, the acoustic signal is configured to be received by a pixel array connected to a first end of the RLC network, wherein each pixel within the pixel array is coupled with at least a portion of the piezoelectric layer, and is configured to detect at least a portion of the detection signal component;
canceling at least a portion of the common mode component from the acoustic signal by introducing a feedback signal to a second end of the RLC network using a common mode canceling circuitry, wherein the feedback signal is determined based on the received acoustic signal at each pixel within the pixel array;
receiving the acoustic signal at the pixel array; and
processing the received acoustic signal to generate data indicative of the fingerprint pattern.

19. The method of claim 18, wherein the feedback signal has an opposite phase than that of the common mode component in the received acoustic signal at each pixel within the pixel array.

20. The method of claim 18, wherein the common mode canceling circuitry comprises a piezoelectric capacitor having a capacitance that is at a predetermined ratio to a capacitance of the piezoelectric layer.

* * * * *